US012804327B2

(12) United States Patent
Ren et al.

(10) Patent No.: US 12,804,327 B2
(45) Date of Patent: Nov. 17, 2026

(54) METHOD FOR FORMING VOICE COIL, VOICE COIL AND SPEAKER INCLUDING THE VOICE COIL

(71) Applicant: AAC Microtech (Changzhou) Co., Ltd., Changzhou City (CN)

(72) Inventors: Zhang Ren, Changzhou (CN); Zhiwei Zhong, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 187 days.

(21) Appl. No.: 18/784,975

(22) Filed: Jul. 26, 2024

(65) Prior Publication Data

US 2025/0317691 A1 Oct. 9, 2025

Related U.S. Application Data

(63) Continuation of application No. PCT/CN2024/086638, filed on Apr. 8, 2024.

(51) Int. Cl.

| | |
|---|---|
| ***H04R 25/00*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ............ *H04R 9/046* (2013.01); *H04R 9/025* (2013.01); *H04R 9/06* (2013.01)

(58) Field of Classification Search
CPC .......... H04R 9/025; H04R 9/046; H04R 9/06; H04R 2400/11; H04R 31/00; H04R 9/02
USPC .......................................................... 381/409
See application file for complete search history.

(56) References Cited

FOREIGN PATENT DOCUMENTS

CN 108566596 A * 9/2018 ............... H04R 9/06

OTHER PUBLICATIONS

CN 108566596 A. Voice Coil Winding (Translation) (Year: 2018).*

* cited by examiner

*Primary Examiner* — Phylesha Dabney
(74) *Attorney, Agent, or Firm* — Wiersch Law Group

(57) ABSTRACT

A method for winding a voice coil, a voice coil and a speaker. The voice coil is formed by winding wires and the method includes forming an inner wire layer by winding wires; forming a first outer wire layer by winding wires on an outer side of the inner wire layer; and forming a second outer wire layer by winding wires on an outer side of the first outer wire layer. The structure and position of the outer wire layer(s) of the voice coil is adjusted by double-obliquely-pulling or triple-obliquely-pulling to obtain an arrangement combination structure of the voice coil with better harmonic distortion, and flatness and symmetry of the voice coil are adjusted to ameliorate distortion. The voice coil is applicable to a case that height of the voice coil is not increased for a speaker, and the defects caused by lightness/thinness of a phone are overcome.

8 Claims, 6 Drawing Sheets

A-A

METHOD FOR FORMING VOICE COIL, VOICE COIL AND SPEAKER INCLUDING THE VOICE COIL

TECHNICAL FIELD

The present disclosure relates to the field of electroacoustic conversion, in particular to a method for forming a voice coil, a voice coil, and a speaker including the voice coil.

BACKGROUND

A voice coil, as one of core components in an audio device, is mainly applied to a sound conversion device such as a speaker and an earphone. A principle thereof is based on electromagnetic induction and vibration principle, and due to interaction between a magnetic field generated by current in a voice coil and a fixed magnetic field, the voice coil generates vibration, so that a vibrating diaphragm connected to the voice coil is driven to generate sound.

A structure design of the voice coil is a key factor that affects performance of the voice coil. However, for the existing voice coil, not every desired arrangement structure of the voice coil can be achieved when an outermost layer is not fully arranged, as a result, an arrangement structure of the voice coil with good harmonic distortion cannot be achieved. Meanwhile, in order to meet lightness and thinness requirements of the mobile phone, the acoustic performance of the voice coil is limited.

Therefore, it needs to provide a new method for forming a voice coil, a voice coil and a speaker provided with the voice coil to solve the above-mentioned technical problems.

SUMMARY

An object of the present disclosure is to provide a voice coil that ameliorates distortion by adjusting voice coil flatness and symmetry. Meanwhile, the voice coil may be applied to a case that the height of the voice coil cannot be effectively increased by the speaker, and the defects caused by the light and thin requirements of the mobile phone can be effectively overcome.

In an aspect, an embodiment of the present disclosure provides a voice coil having a ring structure formed by winding wires with a through-hole formed at a middle of the ring structure. A penetration direction of the through-hole is a height direction of the voice coil. The voice coil includes a top part located at an end along the height direction, a bottom part located at another end along the height direction, and a middle part located between the top part and the bottom part and also located at a center position in the height direction; the voice coil includes multiple wire layers stacked along a direction from inside to outside; and each wire layer of the multiple wire layers includes multiple wire coils stacked along the height direction; and the top part includes M wire layers, the bottom part includes N wire layers, and the middle part includes Y wire layers, where each of M and N is greater than Y, and each of M, N and Y is a natural number.

As an improvement, the multiple wire layers include an inner wire layer enclosing to define the through-hole, a first outer wire layer wound on an outer side of the inner wire layer, and a second outer wire layer wound on an outer side of the first outer wire layer; the middle part includes only the inner wire layer, and the top part and/or the bottom part includes the inner wire layer, the first outer wire layer, and the second outer wire layer; and a number of wire coils of the inner wire layer is greater than a number of wire coils of the first outer wire layer, and the number of wire coils of the first outer wire layer is greater than a number of wire coils of the second outer wire layer.

As an improvement, the top part and/or the bottom part further includes a third outer wire layer wound on an outer side of the second outer wire layer, and a number of wire coils of the third outer wire layer is less than the number of wire coils of the second outer wire layer.

As an improvement, the voice coil includes at least two inner wire layers.

In another aspect, an embodiment of the present disclosure provides a method for forming a voice coil having a ring structure formed by winding wires with a through-hole formed at a middle of the ring structure. A penetration direction of the through-hole is a height direction of the voice coil. The voice coil includes a top part located at an end along the height direction, a bottom part located at another end along the height direction, and a middle part located between the top part and the bottom part and also located at a center position in the height direction; the voice coil includes multiple wire layers stacked along a direction from inside to outside; and each wire layer of the multiple wire layers includes multiple wire coils stacked along the height direction; and the top part includes M wire layers, the bottom part includes N wire layers, and the middle part includes Y wire layers, where each of M and N is greater than Y, and each of M, N and Y is a natural number. The method includes: forming the inner wire layer by winding wires; forming the first outer wire layer by winding wires on the outer side of the inner wire layer; forming the second outer wire layer by winding wires on the outer side of the first outer wire layer, the wire coil of the first outer wire layer that is close to the middle part is closer to the middle part than the wire coil of the second outer wire layer that is close to the middle part, to together form an inclined surface.

As an improvement, the forming the first outer wire layer by winding wires includes: winding wires around the inner wire layer at the top part with a first preset number of turns to form the first outer wire layer at the top part, then obliquely pulling wires to the bottom part, and winding wires around the inner wire layer with a second preset number of turns to form the first outer wire layer at the bottom part.

As an improvement, the forming the second outer wire layer by winding wires includes: winding wires around the first outer wire layer at the bottom part with a third preset number of turns to form the second outer wire layer at the bottom part, then obliquely pulling wires to the top part, and winding wires around the first outer wire layer with a fourth preset number of turns to form the second outer wire layer at the top part.

As an improvement, the third preset number of turns is less than the second preset number of turns; and the fourth preset number of turns of turns is less than the first preset number of turns.

As an improvement, the method further includes: forming a third outer wire layer by winding wires on an outer side of the second outer wire layer.

As an improvement, the forming the third outer wire layer includes: winding wires around the second outer wire layer at the top part with a fifth preset number of turns to form the third outer wire layer at the top part, then obliquely pulling wires to the bottom, and winding wires around the second outer wire layer with a sixth preset number of turns to form the third outer wire layer at the bottom part.

As an improvement, the fifth preset number of turns is less than the fourth preset number of turns, and the sixth preset number of turns of turns is less than the third preset number of turns.

In another aspect, an embodiment of the present disclosure provides a loudspeaker, including a vibration system and a magnetic circuit system. The vibration system includes a voice coil having a ring structure formed by winding wires with a through-hole formed at a middle of the ring structure. A penetration direction of the through-hole is a height direction of the voice coil. The voice coil includes a top part located at an end along the height direction, a bottom part located at another end along the height direction, and a middle part located between the top part and the bottom part and also located at a center position in the height direction; the voice coil includes multiple wire layers stacked along a direction from inside to outside; and each wire layer of the multiple wire layers includes multiple wire coils stacked along the height direction; and the top part includes M wire layers, the bottom part includes N wire layers, and the middle part includes Y wire layers, where each of M and Nis greater than Y, and each of M, N and Y is a natural number.

BRIEF DESCRIPTION OF DRAWINGS

In order to better illustrate technical solutions in embodiments of the present disclosure, the accompanying drawings used in the embodiments are briefly introduced as follows. It should be noted that the drawings described as follows are merely part of the embodiments of the present disclosure, and other drawings can also be acquired by those skilled in the art without paying creative efforts.

Figure 1:
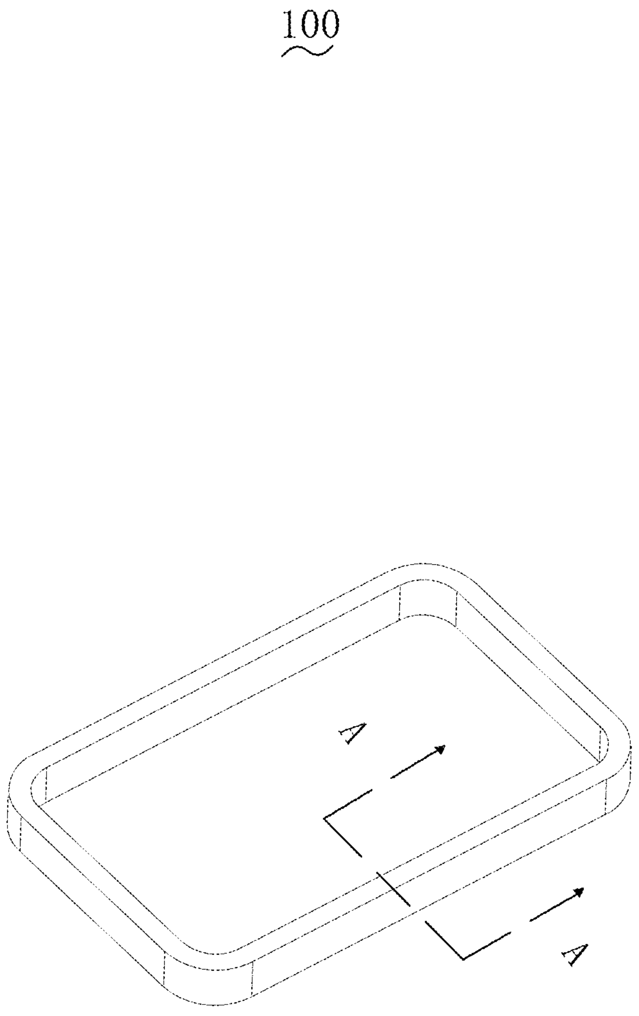
FIG. 1 is a three-dimensional structure diagram of a voice coil according to an embodiment of the present disclosure.

In the figures: 100: voice coil, 1: inner wire layer, 2: first outer wire layer, 201: first outer wire layer at a top part, 202: first outer wire layer at a bottom part, 3: second outer wire layer, 301: second outer wire layer at a top part, 302: second outer wire layer at a bottom part, 4: third outer wire layer, 401: third outer wire layer at a top part, 402: third outer wire layer at a bottom part, 10: top part, 11: middle part, 12: bottom part, 20: through-hole.

DESCRIPTION OF EMBODIMENTS

The technical solutions in the embodiments of the present disclosure are described in the following with reference to the accompanying drawings. It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

Referring to FIG. 1 to FIG. 6, in a first aspect, an embodiment of the present disclosure provides a voice coil 100 having a ring structure formed by winding wires, with a through-hole 20 formed at middle. A height direction of the through-hole 20 is a height direction of the voice coil 100, the voice coil 100 includes a top part 10 located at an end along the height direction, a bottom part 12 located at another end along the height direction, and a middle part 11 located between the top part 10 and the bottom part 12. The voice coil 100 includes multiple wire layers stacked along a direction from inside to outside, and each wire layer of the wire layers includes multiple wire coils stacked along the height direction. The top part 10 includes M wire layers, the bottom part 12 includes N wire layers, and the middle part 11 includes Y wire layers, where each of M and N is greater than Y, and each of M, N and Y is a natural number.

In an embodiment, the multiple wire layers include an inner wire layer 1 enclosing the through-hole 20, a first outer wire layer 2 wound on an outer side of the inner wire layer 1, and a second outer wire layer 3 wound on an outer side of the first outer wire layer 2. The middle part 11 includes only the inner wire layer 1. The top part 10 and/or the bottom part 12 includes the inner wire layer 1, the first outer wire layer 2, and the second outer wire layer 3. A number of wire coils of the inner wire layer 1 is greater than a number of wire coils of the first outer wire layer 2, and the number of wire coils of the first outer wire layer 2 is greater than a number of wire coils of the second outer wire layer 3.

In an embodiment, the top part 10 and/or the bottom part 12 further includes a third outer wire layer 4 wound on an outer side of the second outer wire layer 3, and a number of wire coils of the third outer wire layer 4 is less than the number of wire coils of the second outer wire layer 3.

In an embodiment, the voice coil 100 includes at least two inner wire layers 1.

In an embodiment, the middle part 11 is located at a middle position in the height direction, so that an arrangement combination structure of the voice coil 100 has better harmonic distortion.

In an embodiment, the wire coil at a side of the top part 10 close to the middle part 11 and the wire coil at a side of the bottom part 12 close to the middle part 11 together form an inclined surface, so that an arrangement combination structure of the voice coil 100 has better harmonic distortion.

In a second aspect, an embodiment of the present disclosure further provides a method for forming the voice coil 100 as described in any one of the above-mentioned embodiments. The method for forming the voice coil 100 includes: forming an inner wire layer 1 by winding wires; forming the first outer wire layer 2 by winding wires on the outer side of the inner wire layer 1; and forming the second outer wire layer 3 by winding wires on the outer side of the first outer wire layer 2, the wire coil of the first outer wire layer 2 that is close to the middle part 11 being closer to the middle part 11 than the wire coil of the second outer wire layer 3 that is close to the middle part 11, to together form an inclined surface.

In an embodiment, forming the first outer wire layer 2 by winding wires includes: winding wires around the inner wire layer 1 at the top part 10 with a first preset number of turns to form the first outer wire layer 201 at the top part; then obliquely pulling wires to the bottom part 12, and winding wires around the inner wire layer 1 with a second preset number of turns to form the first outer wire layer 202 at the bottom part.

In an embodiment, forming the second outer wire layer 3 by winding wires includes: after winding wires around the first outer wire layer 2 at the bottom part 12 with a third preset number of turns to form the second outer wire layer 302 at the bottom part; then obliquely pulling wires to the top part 10, and winding wires around the first outer wire layer 2 with a fourth preset number of turns to form the second outer wire layer 301 at the top part.

In an embodiment, the third preset number of turns is less than the second preset number of turns.

In the embodiment, the fourth preset number of turns is less than the first preset number of turns.

Figure 2:
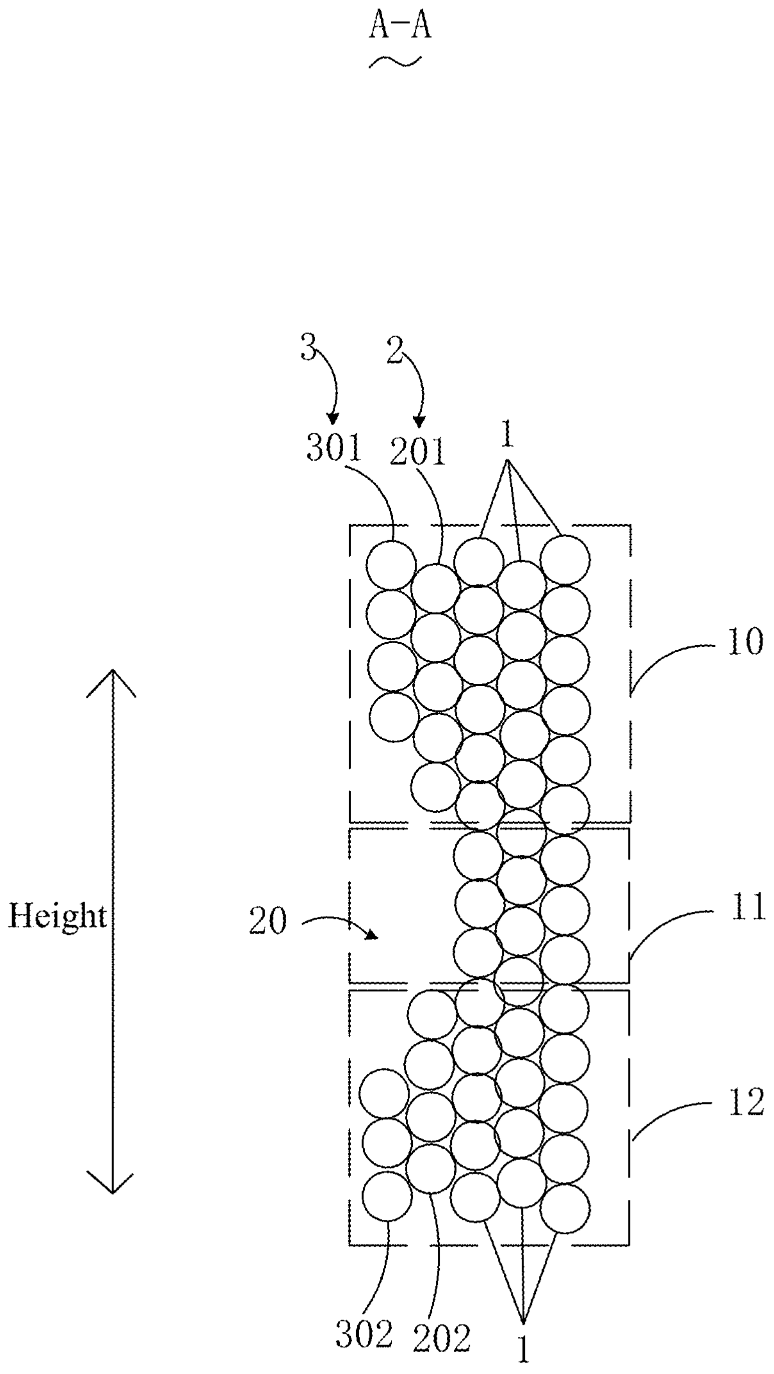
FIG. 2 is a sectional view of a structural schematic diagram of a double-obliquely-pulling voice coil taken along A-A shown in FIG. 1.
Figure 3:
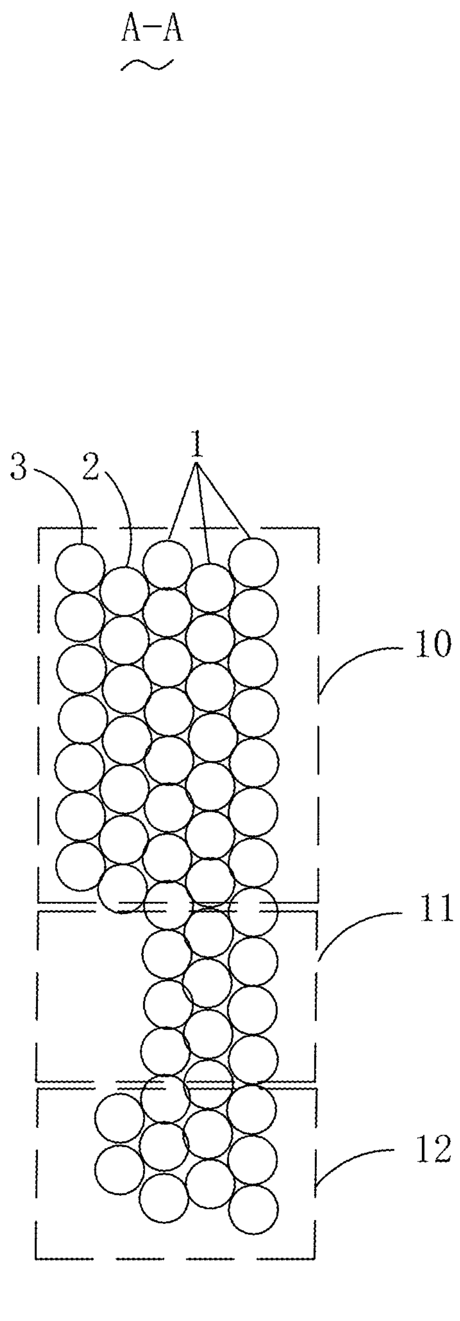
FIG. 3 is a sectional view of a structural schematic diagram of another double-obliquely-pulling voice coil taken along A-A shown in FIG. 1.

In some embodiments, please refer to FIG. 2 and FIG. 3, where FIG. 2 is a sectional view of a structural schematic diagram of a double-obliquely-pulling voice coil taken along A-A shown in FIG. 1, and FIG. 3 is a sectional view of a structural schematic diagram of another double-obliquely-pulling voice coil taken along A-A shown in FIG. 1. A structure of the first outer wire layer 2 and the second outer wire layer 3 may be adjusted through a double-obliquely-pulling process, so that an arrangement combination structure of the voice coil 100 can be adjusted to obtain a voice coil 100 with better harmonic distortion, and thus the flatness and symmetry of the voice coil 100 can be effectively adjusted to ameliorate distortion. The first preset number of turns, the second preset number of turns, the third preset number of turns and the fourth preset number of turns may be set according to actual conditions, to adjust the structure of the voice coil 100, which will not be limited herein.

In an embodiment, the method further includes: forming the third outer wire layer 4 by winding wire on the outer side of the second outer wire layer 3.

In an embodiment, forming the third outer wire layer 4 includes: winding wires around the second outer wire layer 3 at the top part 10 with a fifth preset number of turns to form the third outer wire layer 401 at the top part; then obliquely pulling wires to the bottom part 12, and winding wires around the second outer wire layer 3 with a sixth preset number of turns to form the third outer wire layer 402 at the bottom part.

In an embodiment, the fifth preset number of turns is less than the fourth preset number of turns, and the sixth preset number of turns of turns is less than the third preset number of turns.

Figure 4:
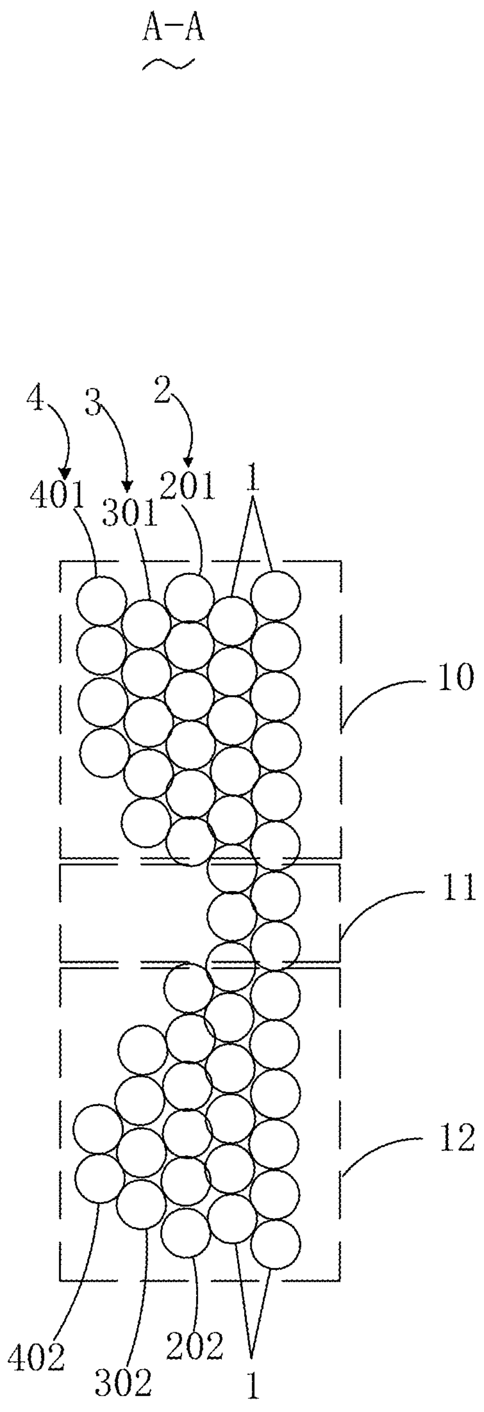
FIG. 4 is a sectional view of a structural schematic diagram of a triple-obliquely-pulling voice coil taken along A-A shown in FIG. 1.
Figure 5:
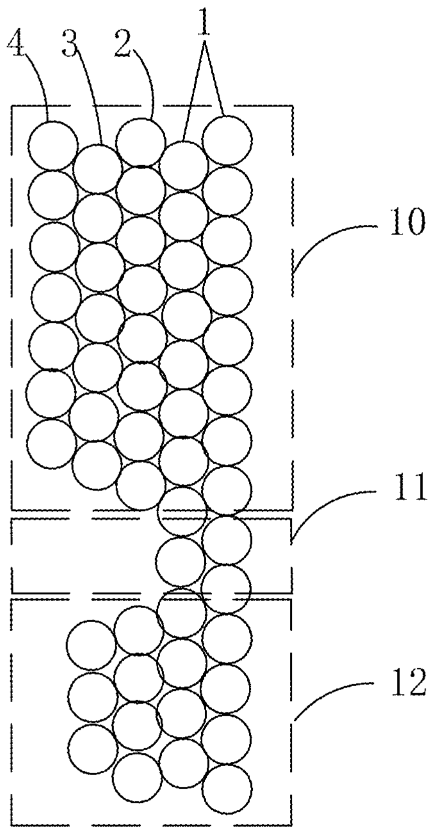
FIG. 5 is a sectional view of another structural schematic diagram of a triple-obliquely-pulling voice coil taken along A-A shown in FIG. 1.
Figure 6:
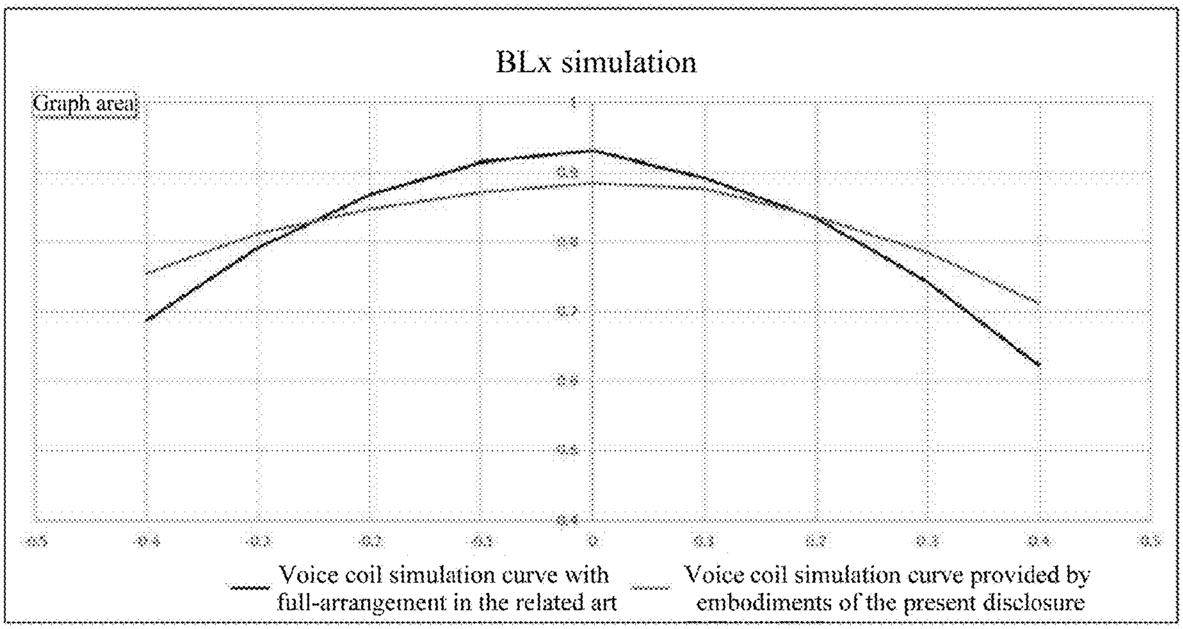
FIG. 6 is a schematic diagram of simulation curves generated by performing BLx simulation on a voice coil in the related art and a voice coil according to an embodiment of the present disclosure.

In some embodiment, please refer to FIG. 4 and FIG. 5, where FIG. 4 is a sectional view of a structural schematic diagram of a triple-obliquely-pulling voice coil taken along A-A shown in FIG. 1, and FIG. 5 is a sectional view of another structural schematic diagram of a triple-obliquely-pulling voice coil taken along A-A shown in FIG. 1. A structure of the first outer wire layer 2, the second outer wire layer 3 and the second outer wire layer 4 can be adjusted through a double-obliquely-pulling process, so that an arrangement combination structure of the voice coil 100 can be adjusted to obtain a voice coil 100 with better harmonic distortion, and thus the flatness and symmetry of the voice coil 100 can be effectively adjusted to ameliorate distortion. The first preset number of turns, the second preset number of turns, the third preset number of turns, the fourth preset number of turns, the fifth preset number of turns, the sixth preset number of turns may be set according to actual conditions, to adjust the structure of the voice coil 100, which will not be limited herein.

Compared with the solutions in the related art, the solutions described in the present disclosure can adjust the structure and the position of the outer wire layer(s) of the voice coil 100 by adopting a double-obliquely-pulling process or a triple-obliquely-pulling process, so as to obtain an arrangement combination structure of a voice coil 100 with better harmonic distortion, and thus the flatness and symmetry of the voice coil 100 can be effectively adjusted to ameliorate distortion. The voice coil 100 with such a structure can be applied to a case that the height of the voice coil 100 cannot be effectively increased for the speaker, and the defects caused by the lightness and thinness requirements of the mobile phone can be effectively overcome.

In a third aspect, an embodiment of the present disclosure further provides a speaker, including a vibration system and a magnetic circuit system, the vibration system being the voice coil 100 as described in the above-mentioned embodiments. The same technical effect of the voice coil 100 as described in the above-mentioned embodiments can be achieved, and details are not described herein again.

The above description merely illustrates some embodiments of the present invention. It should be noted that those skilled in the art may make improvements without departing from a creative concept of the present invention, and all these improvements shall fall into a protection scope of the present invention.

What is claimed is:

1. A voice coil having a ring structure formed by winding wires with a through-hole formed at a middle of the ring structure;

wherein a penetration direction of the through-hole is a height direction of the voice coil; and wherein the voice coil comprises a top part located at an end along the height direction, a bottom part located at another end along the height direction, and a middle part located between the top part and the bottom part and also located at a center position in the height direction; the voice coil comprises multiple wire layers stacked along a direction from inside to outside; and each wire layer of the multiple wire layers comprises multiple wire coils stacked along the height direction; and the top part comprises M wire layers, the bottom part comprises N wire layers, and the middle part comprises Y wire layers, where each of M and N is greater than Y, and each of M, N and Y is a natural number;

wherein the multiple wire layers comprise an inner wire layer enclosing to define the through-hole, a first outer wire layer wound on an outer side of the inner wire layer, a second outer wire layer wound on an outer side of the first outer wire layer, and a third outer wire layer wound on an outer side of the second outer wire layer;

wherein the middle part comprises only the inner wire layer, and the top part and/or the bottom part comprises the inner wire layer, the first outer wire layer, the second outer wire layer, and the third outer wire layer;

wherein the first outer wire layer comprises a wire segment extending obliquely from the top part to the bottom part; the second outer wire layer comprises a wire segment extending obliquely from the bottom part to the top part; and the third outer wire layer comprises a wire segment extending obliquely from the top part to the bottom part.

2. The voice coil as described in claim 1, wherein a number of wire coils of the inner wire layer is greater than a number of wire coils of the first outer wire layer, and the number of wire coils of the first outer wire layer is greater than a number of wire coils of the second outer wire layer.

3. The voice coil as described in claim 2, wherein a number of wire coils of the third outer wire layer is less than the number of wire coils of the second outer wire layer.

4. The voice coil as described in claim 3, wherein the voice coil comprises at least two inner wire layers.

5. A method for forming a voice coil having a ring structure formed by winding wires with a through-hole formed at a middle of the ring structure;

wherein a penetration direction of the through-hole is a height direction of the voice coil; and wherein the voice coil comprises a top part located at an end along the height direction, a bottom part located at another end along the height direction, and a middle part located between the top part and the bottom part and also located at a center position in the height direction; the voice coil comprises multiple wire layers stacked along a direction from inside to outside; and each wire layer of the multiple wire layers comprises multiple wire coils stacked along the height direction; and the top part comprises M wire layers, the bottom part comprises N wire layers, and the middle part comprises Y wire layers, where each of M and N is greater than Y, and each of M, N and Y is a natural number, wherein the method comprises:

forming the inner wire layer by winding wires;

forming the first outer wire layer by winding wires on the outer side of the inner wire layer;

forming the second outer wire layer by winding wires on the outer side of the first outer wire layer, wherein the wire coil of the first outer wire layer that is close to the middle part is closer to the middle part than the wire coil of the second outer wire layer that is close to the middle part, to together form an inclined surface;

forming a third outer wire layer by winding wires on an outer side of the second outer wire layer;

wherein the forming the first outer wire layer by winding wires comprises; winding wires around the inner wire layer at the top part with a first preset number of turns to form the first outer wire layer at the top part, then obliquely pulling wires to the bottom part, and winding wires around the inner wire layer with a second preset number of turns to form the first outer wire layer at the bottom part;

wherein the forming the second outer wire layer by winding wires comprises; winding wires around the first outer wire layer at the bottom part with a third preset number of turns to form the second outer wire layer at the bottom part, then obliquely pulling wires to the top part, and winding wires around the first outer wire layer with a fourth preset number of turns to form the second outer wire layer at the top part;

wherein the forming the third outer wire layer comprises: winding wires around the second outer wire layer at the top part with a fifth preset number of turns to form the third outer wire layer at the top part, then obliquely pulling wires to the bottom, and winding wires around the second outer wire layer with a sixth preset number of turns to form the third outer wire layer at the bottom part.

6. The method as described in claim 5, wherein the third preset number of turns is less than the second preset number of turns; and the fourth preset number of turns of turns is less than the first preset number of turns.

7. The method as described in claim 5, wherein the fifth preset number of turns is less than the fourth preset number of turns, and the sixth preset number of turns of turns is less than the third preset number of turns.

8. A loudspeaker, comprising a vibration system and a magnetic circuit system, wherein the vibration system comprises a voice coil has a ring structure formed by winding wires with a through-hole formed at a middle of the ring structure;

wherein a penetration direction of the through-hole is a height direction of the voice coil; and wherein the voice coil comprises a top part located at an end along the height direction, a bottom part located at another end along the height direction, and a middle part located between the top part and the bottom part and also located at a center position in the height direction; the voice coil comprises multiple wire layers stacked along a direction from inside to outside; and each wire layer of the multiple wire layers comprises multiple wire coils stacked along the height direction; and the top part comprises M wire layers, the bottom part comprises N wire layers, and the middle part comprises Y wire layers, where each of M and N is greater than Y, and each of M, N and Y is a natural number;

wherein the multiple wire layers comprise an inner wire layer enclosing to define the through-hole a first outer wire layer wound on an outer side of the inner wire layer, a second outer wire layer wound on an outer side of the first outer wire layer, and a third outer wire layer wound on an outer side of the second outer wire layer;

wherein the middle part comprises only the inner wire layer, and the top part and/or the bottom part comprises the inner wire layer, the first outer wire layer, the second outer wire layer, and the third outer wire layer;

wherein the first outer wire layer comprises a wire segment extending obliquely from the top part to the bottom part; the second outer wire layer comprises a wire segment extending obliquely from the bottom part to the top part, and the third outer wire layer comprises a wire segment extending obliquely from the top part to the bottom part.

* * * * *